Figure 1:
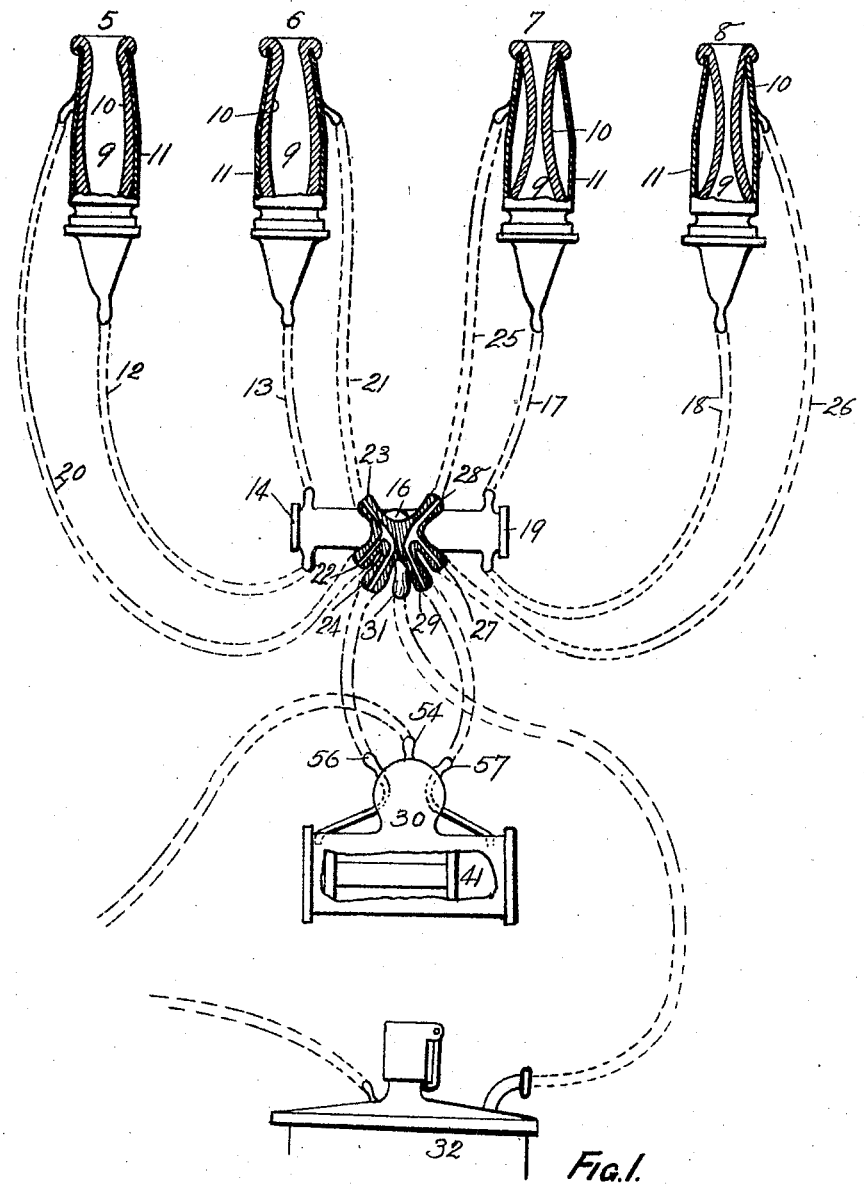

C. R. MITCHELL.
MILKING MACHINERY.
APPLICATION FILED AUG. 31, 1910.

1,018,846.

Patented Feb. 27, 1912.

2 SHEETS—SHEET 1.

WITNESSES

INVENTOR
Charles Robert Mitchell
BY
Wm Wallace White
ATTY.

C. R. MITCHELL.
MILKING MACHINERY.
APPLICATION FILED AUG. 31, 1910.

1,018,846.

Patented Feb. 27, 1912.

2 SHEETS—SHEET 2.

WITNESSES
W. P. Burk
John C. Sanders

INVENTOR
Charles Robert Mitchell
BY Wm Wallace White
ATTY.

UNITED STATES PATENT OFFICE.

CHARLES ROBERT MITCHELL, OF CHATSWOOD, NEW SOUTH WALES, AUSTRALI

MILKING MACHINERY.

1,018,846.  Specification of Letters Patent.  Patented Feb. 27, 1912.

Application filed August 31, 1910. Serial No. 579,905.

*To all whom it may concern:*

Be it known that I, CHARLES ROBERT MITCHELL, a subject of the King of Great Britain, residing at Victoria avenue, Chatswood, in the State of New South Wales and Commonwealth of Australia, engineer, have invented a new and useful Improvement in Milking Machinery, of which the following is a specification.
This invention relates to the milking of cows by machinery wherein suction is exerted in the central chamber of a two chambered teat cup while vacuum and atmospheric pressure are admitted alternatively to the outer of the two chambers. And in such milking processes the admissions of said vacuum and of said atmospheric pressure take place in each teat cup synchronously or in other words the whole of the teat cups are pulsated together resulting in a more or less violent drain upon all the teats of the cow at the same time in a more or less mechanical manner.

Now this invention has been specially devised to substitute for this more or less mechanical process a process whereby there is a pressure only upon some of the teats of the cow while at the same time the other teats are relieved from pressure and so resulting in the withdrawal of milk only from the former teats, while the latter are replenishing.

The improvement in milking processes according to this invention consists then in subjecting some or the half of the teats of a cow to pressure while the others or the other half of them are allowed to dilate and so on alternately for the purpose of withdrawing milk from the former while the latter are replenishing and the improvements in milking machinery consist in a novel construction of teat cup cluster and the combinations thereof with a pulsator.

In carrying this invention into effect the base of the teat cups or the inflater thereof placed on the teat of the cow are connected by means of a novel construction of cluster and flexible connection to the milk receiver or vacuum piping.
In carrying this invention into effect a receiving vessel or vessels, suction pipings, double acting pulsators and two chambered teat cups as usual are employed and each cluster has a receiving passage for the milk in communication with the receiving vessel and with the internal chamber of the teat also as ordinarily, but in addition each cluster has two separate and independent pulsation passages each connected independently to one end of the double acting pulsator and to the outer chamber or inflater spaces of two of the series of four teat cups of said cluster. Now the teat cups being applied to the teats of a cow with say the two cups having the inflater space connections to the one pulsation passage connected to one end of the pulsator on the teats of the fore quarters of the udder, and the two cups having the inflater space connections to the other pulsation passage connected to the other end of the pulsator, and suction being set up in the teat cups and in the pulsator, milk will be drawn from one of the two sets of teats while the other set is allowed to dilate. In order however to illustrate how best this invention may be carried into practical effect the same will now be described with reference to the drawings accompanying and forming part of this complete specification in which—

Figure 2:
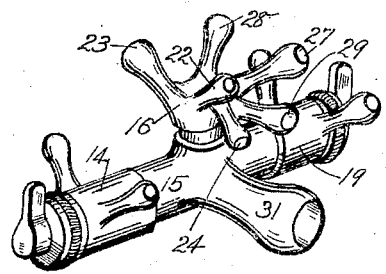
Figure 3:
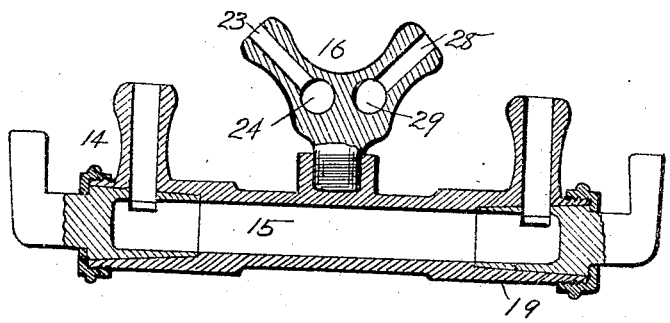
Figure 4:
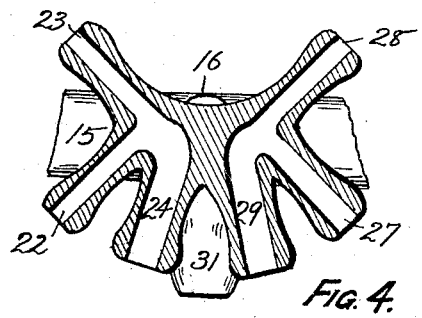

Figure 1 is a diagrammatic view of the teat cups the cluster the pulsator and the receiving vessel showing the connections necessary in the milking process according to this invention. And Fig. 2 is a perspective view of the improved cluster used therein with Figs. 3 and 4 as diagrammatic sectional views of parts thereof.

The parts used and now to be further described are adapted to be applied to any machinery which will give the desired suction and pulsations but are preferably adapted to be utilized in connection with parts having the requisite functions such as those described in my copending application filed July 7th, 1910, Serial No. 570,781.

The teat cups 5, 6, 7, and 8 have central chamber 9 with flexible walls 10 and rigid casing 11 with flexible suction connections 12 and 13 to the end 14 of the suction passage 15 of the cluster 16 and similar connections 17 and 18 to the other end 19 of said passage 15. The inflater spaces of the two teat cups 5 and 6 are joined up by flexible connections 20 and 21 respectively to the nipples 22 and 23 of the pulsation passage 24 of the pulsator 30 while the inflater spaces of the other two teat cups 7 and 8 are similarly joined up by connections 25 and 26 to the nipples 27 and 28 of the other pulsation passage 29 of said pulsator 30. These passages 24 and 29 are flexibly connected to the nipples 56 and 57 of a pulsator constructed as that described in the hereinbefore mentioned application and having communication through the valve of said pulsator with opposite ends of the cylinder 41 thereof. The nipple 54 of the pulsator valve is connected by flexible connection to the source of vacuum and the nipple 31 of the suction passage 15 of the cluster 16 is connected with the milk receiver 32 in turn joined up to the source of vacuum.

In operation as the valve of the pulsator 30 reciprocates the inflaters of the two teat cups 5 and 6 expand as shown and allow the teats to dilate while being connected as described with the other end of the pulsator independently of said teat cups 5 and 6 the inflaters of the teat cups 7 and 8 contract and imparting squeezing action on the teats in such cup withdraw the milk therefrom. And these series of two and two teat cups operate thus alternately in releasing and squeezing the teats with a more natural effect and a beneficial result in the quality of milk obtained and to the animal.

It will be seen that having the divided and independent pulsation passages in the cluster and independent connections to a double acting pulsator or to more than one double acting pulsator that any series of pressed and released teats might be provided for though excellent results are attained by the connections shown and described.

What I claim and desire to secure by Letters Patent is:—

1. In milking machines, in combination, a plurality of teat cups, each teat cup having a central chamber and an inflater space, a pulsator, a cluster, said cluster being provided with a suction passage adapted to be connected to a source of suction, connections between said suction passage and the central chambers of said teat cups, said cluster being provided with a plurality of independent pulsation passages adapted to be connected to said pulsator, one of said pulsation passages being connected to the inflater space of one of the said teat cups and the other of said pulsation passages being connected to the inflater space of another of said teat cups.

2. In milking machines, in combination, a cluster provided with a suction passage, an outlet nipple communicating therewith and adapted to be connected to a source of suction, a plurality of inlet nipples communicating with said passage and adapted to be connected with the teat cups, said cluster being further provided with a plurality of independent pulsation passages, each of said passages having an outlet nipple communicating therewith and adapted to be connected to a pulsator and each of said pulsation passages being provided with an inlet nipple adapted to be connected to the teat cups.

3. In milking machines, in combination, a cluster provided with a suction passage, an outlet nipple communicating therewith and adapted to be connected to a source of suction, four inlet nipples communicating with said passage and adapted to be connected with the teat cups, said cluster being further provided with two independent pulsation passages, each of said passages having an outlet nipple communicating therewith and adapted to be connected to a pulsator and each of said pulsation passages being provided with two inlet nipples adapted to be connected to the teat cups.

In testimony whereof I have signed my name to this specification in the presence of two subscribing witnesses.

CHARLES ROBERT MITCHELL.

Witnesses:
  PERCY NEWELL,
  ISA EASTON.